March 24, 1953 P. D. BECKER 2,632,198

CLOSURE MEMBER OR FURNITURE GLIDE

Filed March 18, 1950

INVENTOR:
PHILIP D. BECKER,
BY Philip E. Parker
ATTORNEY.

Patented Mar. 24, 1953

2,632,198

UNITED STATES PATENT OFFICE 2,632,198

CLOSURE MEMBER OR FURNITURE GLIDE

Philip D. Becker, Hingham, Mass., assignor to United-Carr Fastener Corporation, Cambridge, Mass., a corporation of Massachusetts Application March 18, 1950, Serial No. 150,388

4 Claims. (Cl. 16—42)

This invention relates generally to closure members, and has particular reference to closure members used for insertion into the ends of tubular members such as metal furniture legs.

The object of the invention is to provide a closure member which is adapted to be inserted into the ends of a pair of adjacent tubular members to retain the members in fixed relation to one another.

A further object of the invention is to provide a closure member for assembly in the ends of a pair of adjacent tubular members which is provided with means for entering opposing apertures in the ends of the walls of the tubular members to prevent orbital movement of the tubular members relative to each other.

Other objects of the invention will, in part, be obvious, and will, in part, appear hereinafter. For a fuller understanding of the nature and objects of the invention, reference should be had to the following detailed description, taken in conjunction with the accompanying drawing, in which.

Figure 1:
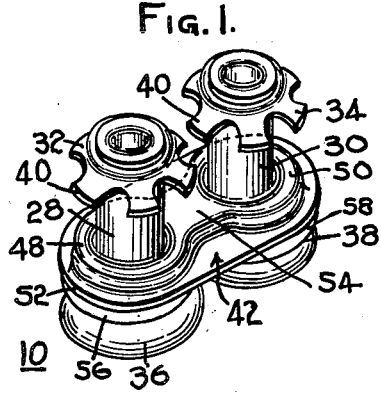
Fig. 1 is a perspective view of a closure member embodying the features of the invention.
Figure 2:
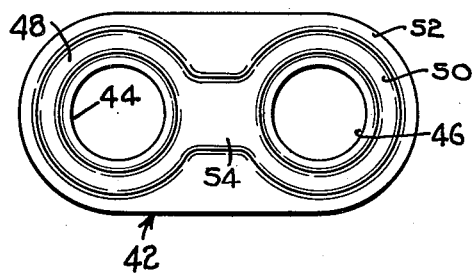
Fig. 2 is a plan view of a base plate used in the closure member of Fig. 1.
Figure 3:
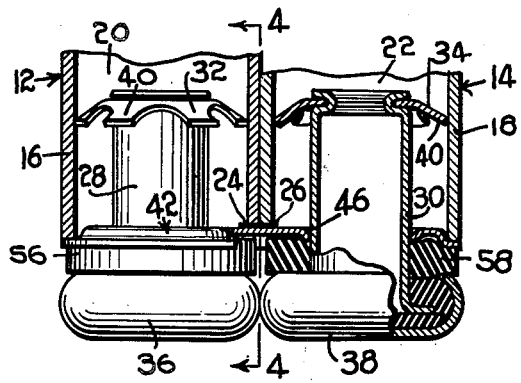
Fig. 3 is a view in elevation, partly in section, of the closure member of Fig. 1 assembled in a pair of adjacent tubular members.
Figure 4:
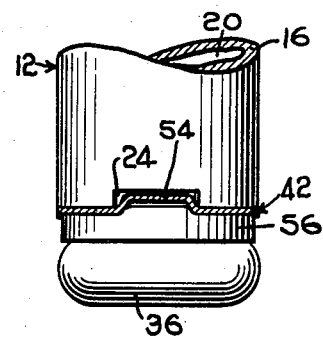
Fig. 4 is a view in section taken on line 4—4 of Fig. 3.

Referring to the drawing, in the embodiment of Figs. 1 to 4, there is illustrated a closure member 10, which is adapted for assembly into the ends of a pair of adjacent tubular members 12 and 14 to retain them in fixed relation to one another. The tubular members may form the leg of an article of furniture (not shown) in which case the closure member 10 also serves as a glide for supporting said article. The tubular members 12 and 14 comprise generally cylindrical metal walls 16 and 18 forming internal bores 20 and 22, which are provided with opposing indentations or apertures 24 and 26 in the ends thereof.

In the embodiment of Figs. 1 to 4, the closure member 10 comprises a pair of column members 28 and 30 for entering the bores of the tubes, having tube-engaging members 32 and 34 mounted on the upper ends thereof, and base members 36 and 38 mounted on the lower ends. The tube-engaging members 32 and 34 may comprise flexible plates with serrated edges forming teeth 40, and are slightly larger in diameter than the diameter of the tubes so that when the closure member is assembled, the teeth 40 flex downwardly and bite into the internal surface of the walls 16 and 18 of the tubes.

A base plate 42 is assembled on the column members 28 and 30, and is provided with openings 44 and 46 for receiving the column members so that they are maintained in predetermined spaced relation. To properly position the closure member in relation to the ends of the tubes, the plate 42 is provided with upward embossments 48 and 50 about the openings, which are substantially circular to conform to the shape of the tubes. A bearing surface 52 is disposed about the embossments 48 and 50 to seat against the ends of the tubes when the fastener is assembled thereon. To prevent orbital movement of the tubes about each other, a connecting embossment 54 is provided on the base plate, which extends between the embossments 48 and 50, and is of a size and shape to fit into the indentations or apertures 24 and 26.

The closure member 10 is assembled by forcing the column members 28 and 30 into the bores 20 and 22 of the tubes until the bearing surface 52 of the base plate seats against the ends of the tubes, and the embossments 48 and 50 enter the ends of the tubes, and the connecting embossment 54 enters the apertures 24 and 26. The teeth 40 of the tube-engaging members 32 and 34 engage the internal surface of the walls of the tubes to retain the closure member in assembly therewith. If desired, washers 56 and 58 of rubber or other resilient material may be assembled on the columns 28 and 30 beneath the base plate 42, in which case the closure member may be driven into the tubes so that the washers are slightly compressed, thereby causing the teeth 40 to more firmly engage the tubes. After assembly, movement of the individual tubes relative to the closure member is prevented by the embossments 48 and 50, and orbital movement of the tubes around each other is prevented by the connecting embossment 54 disposed in the apertures 24 and 26.

Figure 5:
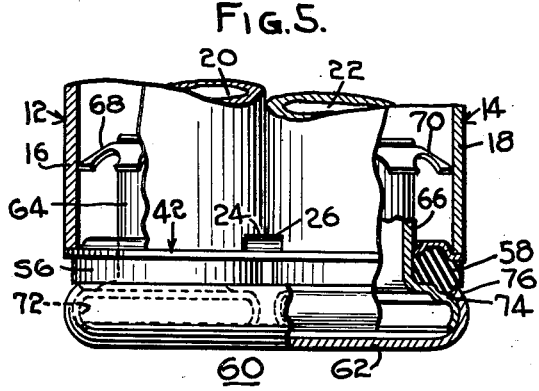
Fig. 5 is a view in elevation, partly in section of a modified form of closure member embodying the features of the invention.
Figure 6:
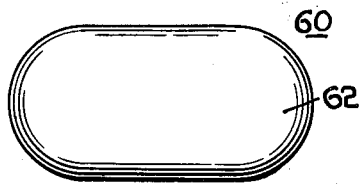
Fig. 6 is a bottom plan view of the closure member of Fig. 5.

Referring now to Figs. 5 and 6, there is illustrated a modified form of closure member embodying the features of the invention. In this embodiment, a closure member 60 comprises a base 62, which has a pair of support column members 64 and 66 mounted thereon. The column members 64 and 66 are similar to those hereinbefore described, and are provided with tube-engaging members 68 and 70 at the upper ends thereof, and flanged portions 72 and 74 at the lower ends, which are retained in assembly with the base by an inwardly turned portion 76 disposed about the outer periphery of the base. In this embodiment, the base plate 42 is assembled on the column members in a manner similar to that hereinbefore described, and the operation of assembly of the device is also identical.

Since certain obvious modifications may be made in the device without departing from the scope of the invention, it is intended that all matter contained herein be interpreted in an illustrative, and not in a limiting sense.

I claim:

1. A closure member for assembly in the ends of a pair of adjacent tube members, said closure member comprising a pair of spaced column members for entering the ends of the tubes, said spaced column members having means thereon for engagement with the tubes, and a base plate assembled on the column members, said base plate having openings therein receiving the column members, and an upwardly embossed portion disposed thereon for entering apertures in the ends of the walls of the tubes when the closure member is assembled.

2. A closure member for assembly in the ends of a pair of adjacent tube members, said closure member comprising a pair of spaced support column members for entering the ends of the tubes, said support column members having means thereon for engagement with the tubes, and a base plate assembled on the support column members for bearing against the ends of the tubes, said base plate having openings receiving the support column members, upwardly embossed portions disposed about the openings for entering the ends of the tubes to position the closure member relative to the tubes, and a connecting embossed portion disposed between the openings so as to enter apertures in the ends of the walls of the tubes when the closure member is assembled therein.

3. A closure member for assembly in the ends of a pair of adjacent tube members, said closure member comprising a base, a pair of spaced support column members disposed on the base for entering the ends of the tubes and having means thereon for internal engagement with the tubes, and a base plate disposed on the base for bearing against the ends of the tubes, said base plate having openings therein receiving the column members, and upwardly embossed means disposed thereon for entering apertures in the ends of the tubes when the closure member is assembled, thereby preventing orbital movement of the tubes relative to each other.

4. A closure member for assembly in the ends of a pair of adjacent tube members, said closure member comprising a base, a pair of spaced support column members disposed on the base for entering the ends of the tubes, said support column members having means on the upper end thereof for internal engagement with the tubes, and a base plate disposed on the base for bearing against the ends of the tubes, said base plate having openings therein receiving the column members, and a pair of spaced upwardly embossed portions for entering the ends of the tubes, and a medial upwardly embossed portion for entering opposing apertures in the adjacent portions of the ends of the tubes when the closure member is assembled to prevent orbital movement of the tubes relative to one another.

PHILIP D. BECKER.

REFERENCES CITED

The following references are of record in the file of this patent:

UNITED STATES PATENTS

| Number | Name | Date |
|---|---|---|
| D. 126,593 | Rohde | Apr. 15, 1941 |
| 1,789,974 | Grant | Jan. 27, 1931 |
| 1,844,077 | Silverman | Feb. 9, 1932 |
| 1,995,260 | Flint | Mar. 19, 1935 |
| 2,485,784 | Shoenberg | Oct. 25, 1949 |
| 2,546,492 | Booth | Mar. 27, 1951 |